(12) United States Patent
Sample (10) Patent No.: US 6,426,882 B1
(45) Date of Patent: Jul. 30, 2002

(54) HOUSING FOR ELECTRONIC COMPONENTS

(75) Inventor: Greg Sample, Newberg, OR (US)

(73) Assignee: InFocus Systems, Inc., Wilsonville, OR (US)

(*) Notice: Subject to any disclaimer, the term of this patent is extended or adjusted under 35 U.S.C. 154(b) by 0 days.

(21) Appl. No.: 09/992,040

(22) Filed: Nov. 21, 2001

(51) Int. Cl.$^7$ ................................................ H05K 9/00
(52) U.S. Cl. ...................... 361/818; 361/800; 361/816; 439/540.1; 439/545; 220/4.02
(58) Field of Search ................................. 361/750, 752, 361/816, 818, 800, 801, 825; 220/4.02; 439/540.1, 545

(56) References Cited

U.S. PATENT DOCUMENTS

| | | | | | |
|---|---|---|---|---|---|
| 5,111,362 A | * | 5/1992 | Flamm et al. | .............. | 220/4.02 |
| 5,455,743 A | * | 10/1995 | Miyajima | .................. | 200/296 |
| 5,590,023 A | * | 12/1996 | Hernandez et al. | ......... | 361/683 |
| 5,652,410 A | * | 7/1997 | Hobbs et al. | .............. | 174/35 R |
| 5,836,786 A | * | 11/1998 | Pepe | ........................... | 439/557 |
| 6,053,778 A | * | 4/2000 | Ivan et al. | ............... | 439/540.1 |
| 6,273,752 B1 | * | 8/2001 | Martin et al. | ............ | 439/540.1 |
| 6,312,285 B1 | * | 11/2001 | Berg et al. | .................. | 439/545 |

* cited by examiner

Primary Examiner—David Martin
Assistant Examiner—Thanh S. Phan
(74) Attorney, Agent, or Firm—Schwabe, Williamson & Wyatt; Paul J. Fordenbacher (57) ABSTRACT

An electronics housing enabled to compensate for the accumulation of dimensional tolerances to enable reliable connection between one or more connectors mounted to internal electronic components and external connectors from one or more external devices. An alignment plate is provided that adapts an aperture in the housing to the connectors. The alignment plate is adapted to account for tolerance accumulation by being positional within the housing while substantially covering the space between the connectors and the housing aperture. The alignment plate in cooperation with an EMI a shield provides electromagnetic shielding about the connectors.

18 Claims, 5 Drawing Sheets

HOUSING FOR ELECTRONIC COMPONENTS

FIELD OF THE INVENTION

The present invention relates to housings containing electronic components having connectors for communication with external devices and, more particularly to a housing which enables connectors mounted on internal components to reliably engage the connectors of external devices in the presence of assembly and manufacturing dimensional tolerance accumulation.

BACKGROUND OF INVENTION

It is well known that in the image projection, communication, navigation, computer and like industries manufacturing electronic systems, that the electronic systems are made up of a plurality of subsystems with one or more of the subsystems being assigned to a particular printed circuit board (PC board). The PC board is normally in a housing. It is required that the PC board be received in the housing in a manner enabling the PC board to be removed from the housing for maintenance, repair and/or replacement. Mounted on the PC board are one or more electrical connectors, plugs, or receptacles that are adapted to couple with external mating connectors, plugs or receptacles for power and/or signal paths between the PC board inside the housing and external devices.

The electronics housing comprises a bezel having connector apertures. The bezel is likened to a frame that surrounds the connectors of an internal electronic device. The PC board is mounted within the housing strategic to the bezel apertures wherein the PC board connectors are positioned behind, flush with, or protruding from the apertures. An external device can therefore access a connector with a mating connector either externally if the connector protrudes through the aperture or by passing the mating connector though the aperture to mate with the connector within.

It is well known in the art that the manufacture and assembly dimensional tolerances provided by the electronic system design requires very precise matching of the housing mounting apparatus with the PC board attachment. Further, precise manufacture of the electrical connector arrangement on the PC board is required for proper alignment of the connectors with the apertures in the bezel. This precise matching of components to the housing/bezel adds to the cost of the electronic system.

For practical reasons known to those in the art of manufacture and assembly, all of the components of the electronic system have associated with them a dimensional tolerance. Even with precise manufacturing processes of the PC board and the housing together with the connector mounting arrangement, the accumulation of dimensional tolerances can lead to a misalignment of assembled components. In particular, the accumulation of tolerances can result in a misalignment between the PC mounted connectors and their corresponding bezel apertures. Connector/aperture misalignment can prevent reliable connection or preclude connection at all between the connector on the PC board and the connector of the external device. Significant disassembly and rework of the components of the electronic system to remedy this misalignment is labor intensive and not conducive to maintaining manufacturing efficiencies.

There is a need for apparatus and methods to account for the accumulation of manufacture and assembly tolerances and to accommodate those tolerances to provide proper alignment of the PC board connectors and the access apertures in the housing bezel.

SUMMARY OF INVENTION

An electronics housing enabled to compensate for the accumulation of dimensional tolerances to enable reliable connection between one or more connectors mounted to internal electronic components and external connectors from one or more external devices. An alignment plate is provided that adapts an aperture in the housing to the connectors. The alignment plate is adapted to account for tolerance accumulation by being positional within the housing while substantially covering the space between the connectors and the housing aperture. The alignment plate in cooperation with an EMI shield provides electromagnetic shielding about the connectors.

DESCRIPTION

In the following detailed description, reference is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

The following description will be directed to an adjustable alignment plate as it relates to an arrangement of electrical connectors on a printed circuit (PC) board and their relationship with a housing or a housing including a bezel. However, it is to be understood that other electrical components mounted inside a housing requiring connection with external sources via one or more connectors can also benefit from the adjustable alignment plate of the present invention.

Figure 1:
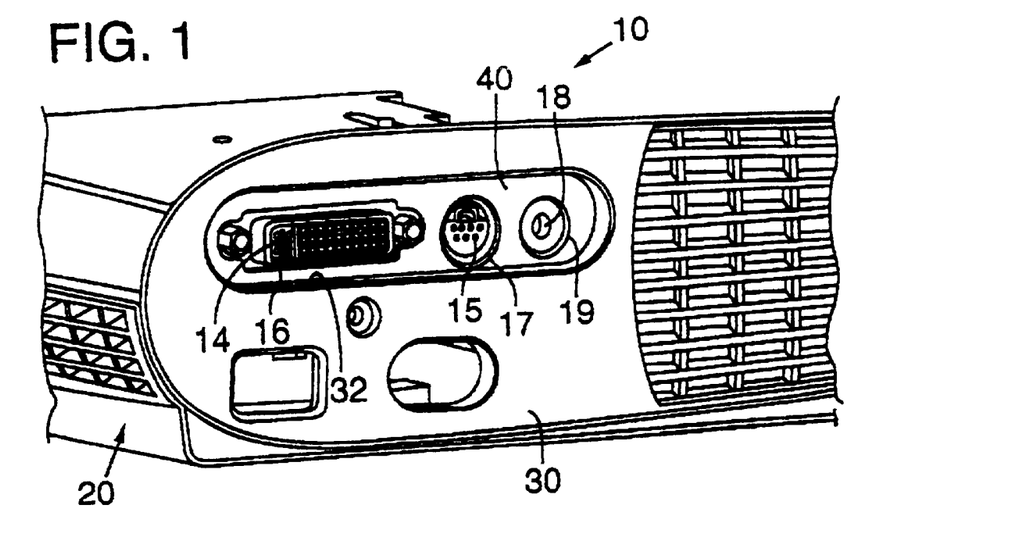
FIG. 1 is a side perspective view of an electrical system in accordance with an embodiment of the invention.

FIG. 1 is a side perspective view of an electrical system 10 in accordance with an embodiment of the invention. The electrical system 10 comprises a housing 20 containing an electrical component mounted within. The electrical component comprises a protruding connector 14, a flush-mounted connector 15, and a jack connector 18, all of which are adapted to accept mating connectors from devices external to the housing 20. The three connectors 14,15,18 referred to herein are examples of different types of connectors known in the art. They are used here for illustrative purposes only and not intended to limit the scope of the invention.

The housing 20 further comprises a bezel 30 having a bezel aperture 32 that provides accessibility by external mating connectors. The housing 20 further comprises an alignment plate 40. The alignment plate 40 comprises a first aperture 16 adapted to closely conform to the external shape of the protruding connector 16. A second aperture 17 and third aperture 19 are adapted to provide access to the flush-mounted connector 15 and the jack connector 18, respectively, by external connectors.

Figure 2:
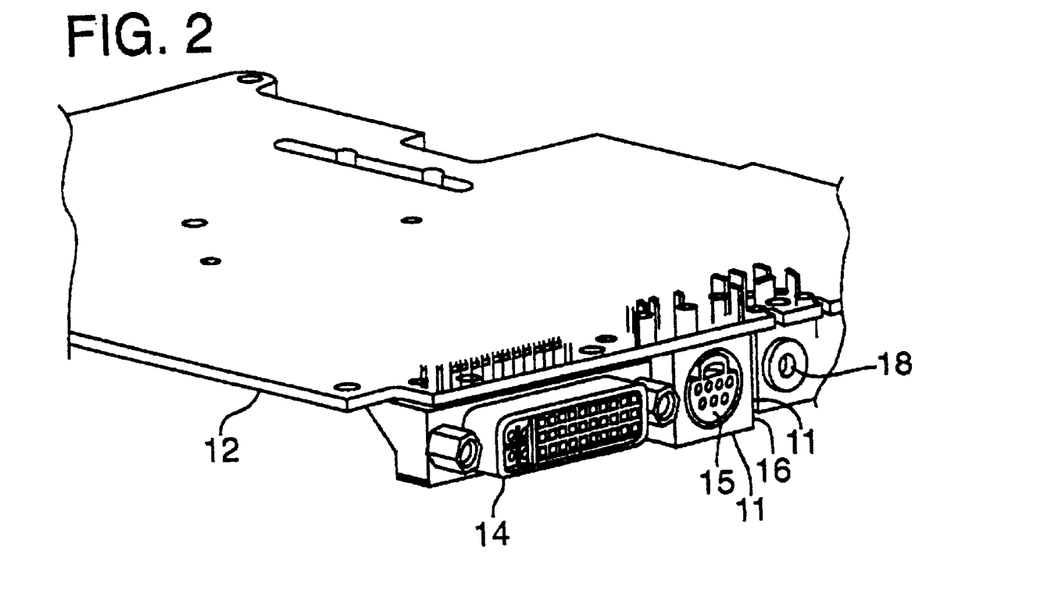
FIG. 2 is a view of a PC board with connectors mounted thereon.

FIG. 2 illustrates the PC board 12 with the corresponding connectors 14,15,18 mounted thereto. The manufacture and assembly tolerance of the mounted connectors 14,15,18 with respect to the PC board 12 is commonly very small; a benefit derived by the exacting process involved in manufacturing PC boards. Therefore, the manufacture tolerance of the alignment plate 40 with corresponding apertures 14,15,18 can be very small, the benefit of which will be discussed below.

Figure 3:
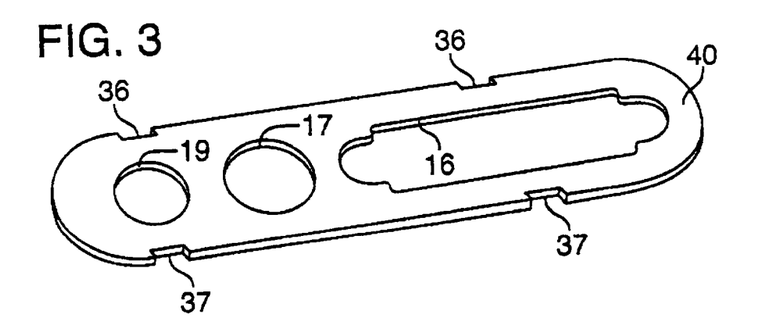
FIG. 3 is a view of an alignment plate in accordance with an embodiment of the invention.

FIG. 3 illustrates the alignment plate 40 comprising the first, second and third apertures 16,17,19. The alignment plate 40 is positioned between the PC board 12 and the bezel 30. The alignment plate 40 is adapted to adjust or shift with respect to the bezel 30 to accommodate for the accumulation of manufacture and assembly tolerances while effectively covering the space between the bezel aperture 32 and the connectors 14,15,18.

Figure 4:
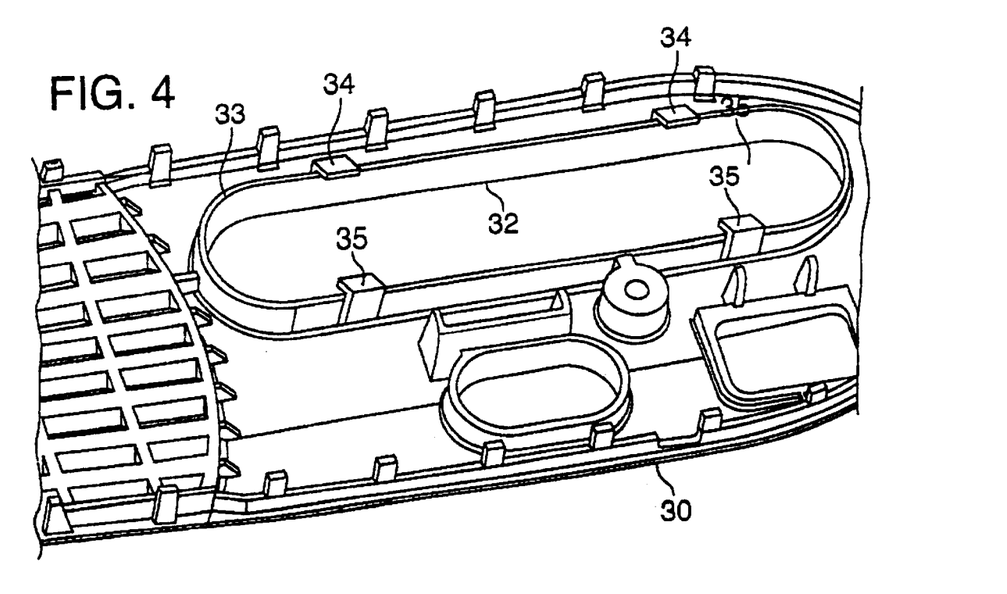
FIG. 4 is a view of the bezel in accordance with an embodiment of the invention.

FIG. 4 illustrates the inside view of the bezel 30. The bezel 30 further comprises a pair of first tabs 34 and a pair of second tabs 35. The first tabs 34 and second tabs 35 extend a distance from a bezel aperture lip 33 at least equal to the thickness of the alignment plate 40. The first tabs 34 are spaced closer to each other than the second tabs 35, the significance to be described below.

Figure 5:
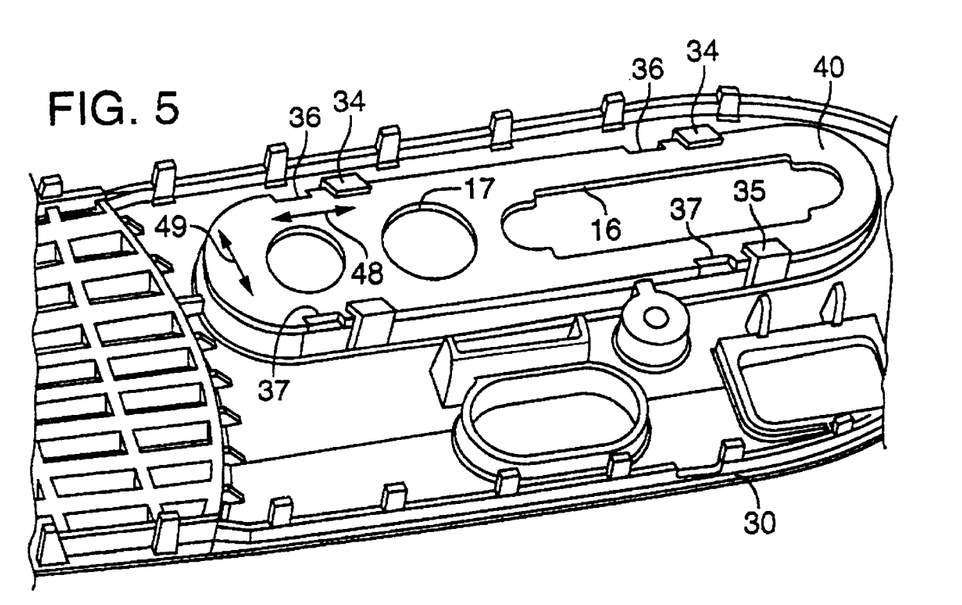
FIG. 5 is a view of the bezel and alignment plate in accordance with an embodiment of the invention.

FIG. 5 illustrates the inside of the bezel 30 coupled with the alignment plate 40. When assembled, the alignment plate 40 is held between the bezel aperture lip 33 and the first tabs 34 and second tabs 35.

The alignment plate 40 comprises a pair of first notches 36 and a pair of second notches 37 as shown in FIGS. 3 and 5. The pair of first notches 36 and the pair of second notches 37 are in complimentary relationship with the pair of first tabs 34 and second tabs 35. The alignment plate 40 is coupled to the bezel 30 by aligning the first notches 36 with the first tabs 34 and the second notches 37 with the second tabs 35. Once aligned, the alignment plate 40 is placed against the bezel aperture lip 33 with the tabs 34,35 passing through the notches 36, 37. The alignment plate 40 is subsequently shifted longitudinally, as indicated by arrow 48, with respect to the bezel 30 such that the notches 36,37 and tabs 34,35 are no longer aligned and the alignment plate 40 is held between the bezel aperture lip 33 and the tabs 34,35.

The first tabs 34 are spaced closer to each other than the second tabs 35 to ensure that the alignment plate 40 is coupled to the bezel 30 in the correct orientation. This provides an added measure of safety that prevents the alignment plate 40 from being assembled to the bezel 30 in a wrong orientation. If the alignment plate 40 were to be turned around or flipped, the first notches 36 and second notches 37 would not be in alignment with the first tabs 34 and the second tabs 35, respectively. In other embodiments in accordance with the invention, the tabs 34,35 and notches 36,37 are located in other arrangements suitable for the particular purpose.

In the embodiment of FIG. 5, the first tabs 34 and the second tabs 35 are spaced such that they do not restrict the movement of the alignment plate 40 in the longitudinal direction as indicated by arrow 48. In this way, the alignment plate 40 can accommodate dimensional tolerance accumulation in the longitudinal dimension. In another embodiment of the invention, not shown, the first tabs 34 and the second tabs 35 are spaced to allow the alignment plate 40 to not only move in the longitudinal direction but also to a limited degree, in the transverse direction, as indicated by arrow 49. In this way, the alignment plate 40 can accommodate dimensional tolerance accumulation in both the longitudinal and transverse dimension As shown in FIG. 1, the protruding connector 14 protrudes through the first aperture 16, which is substantially conformal to the exterior shape of the protruding connector 14. In effect, when assembled, the protruding connector 14 acts to align the alignment plate 40 with the other connectors 15,15,18 on the PC board 12.

Figure 6:
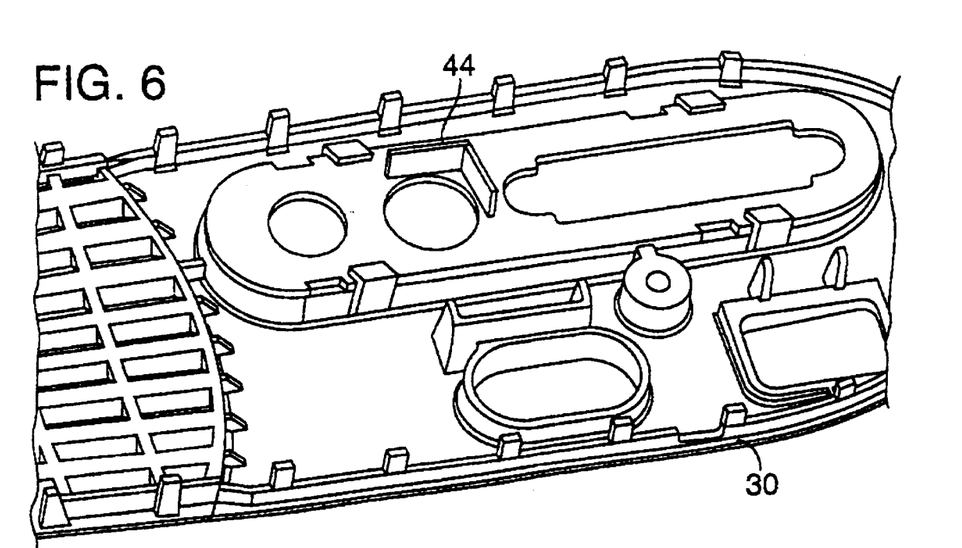
FIG. 6 is a view of the alignment plate in accordance with an embodiment the invention.

FIG. 6 illustrates an embodiment in accordance with the present invention of an alignment plate 40 having an alignment rib 44. The alignment rib 44 is adapted to abut one of the connectors in order to assist in aligning the alignment plate 40 with the connectors on the PC board 12. Referring to FIG. 2, the flush connector 15 has a square body portion 16 having two perpendicular sides 11. In the embodiment of the alignment plate 40 illustrated in FIG. 6, the body portion 16 can be used to align the alignment plate 40 with respect to the connectors 14,15,18 on the PC board 12. The alignment rib 44 is shaped to conform to the two perpendicular sides 11 of the connector body 16. The contact between the body portion 16 and the rib 44 aligns the alignment plate 40 with the connectors 14,15,18 in both the transverse and longitudinal direction. This registration of the alignment rib 44 with the connector 15 assists in accurately locating the alignment plate 40 with all the attached connectors 14,15,18. This embodiment of the alignment plate 40 is beneficial, for example, but not limited to, electrical systems having a protruding connector 14, as well as electrical systems wherein there are no protruding connectors on the PC board 12.

Figure 7:
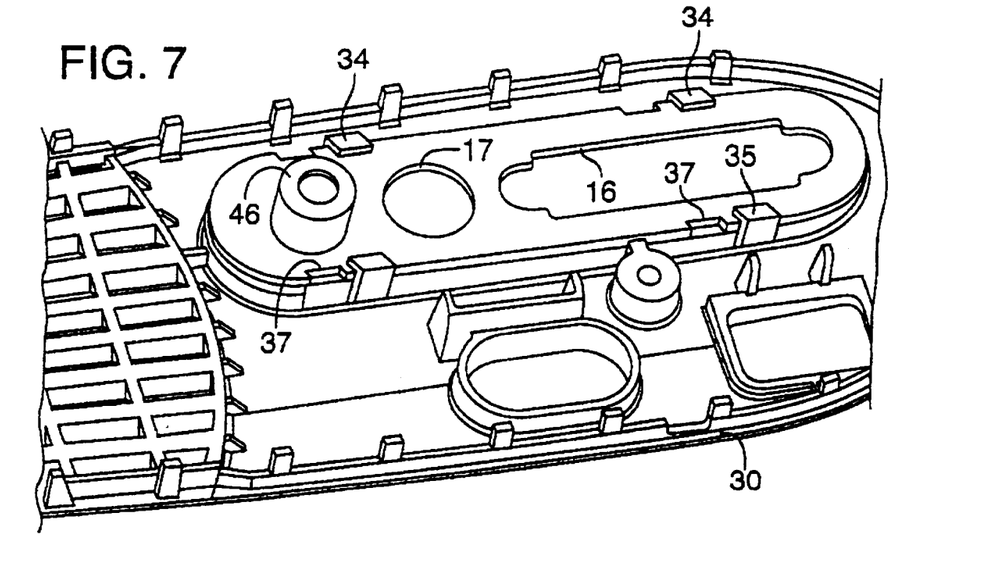
FIG. 7 is a view of the alignment plate in accordance with another embodiment the invention.

In another embodiment in accordance with the present invention, illustrated in FIG. 7, alignment plate 40 comprises a raised boss 46 that surrounds and conforms to the aperture 19 (hidden from view, see FIG. 3). The raised boss 46 can be beneficial in a number of ways. In one embodiment, not shown, the raised boss 46 can be used as an alignment aid wherein the raised boss 46 is adapted to slide over a body portion of a connector. In another embodiment, not shown, wherein the connector on the PC board 12 is set back from the other connectors, the raised boss 46 is used as an extension of the alignment plate 40 wherein the length of the raised boss 46 corresponds to the setback distance of the connector. Additionally, in this embodiment, the raised boss 46 can be used to guide an external connector into the connector on the PC board 12.

Electromagnetic interference (EMI) is a persistent problem in electrical systems and in particular near the interface between internal and external connectors. It is beneficial to limit the EMI exiting or entering the electronic system, especially through apertures and gaps in the housing.

Figure 8:
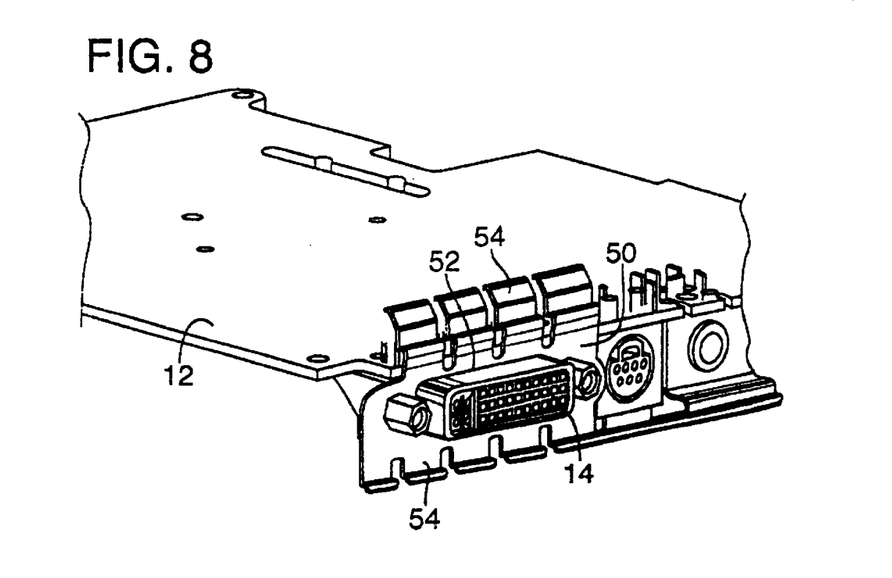
FIG. 8 is a view of an electromagnetic shield in accordance with an embodiment the invention.
Figure 9:
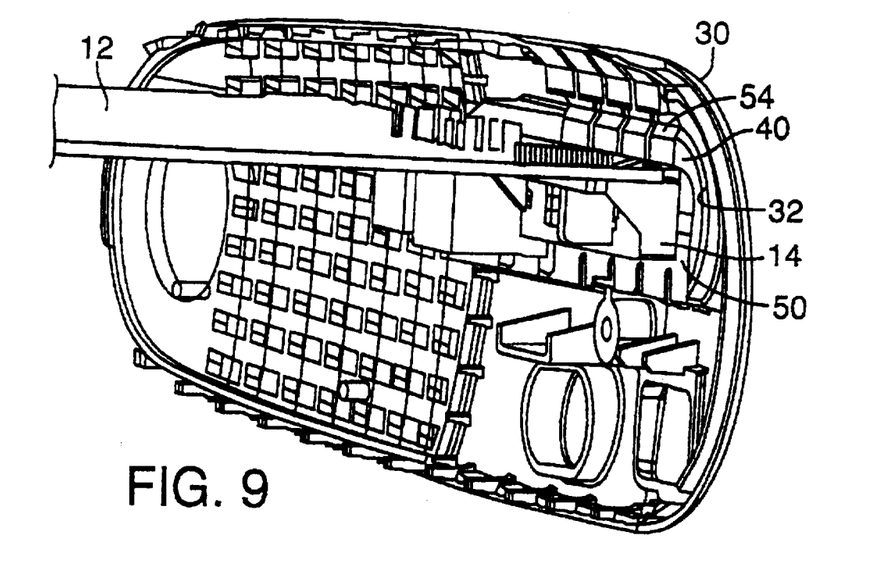
FIG. 9 is a view of the electromagnetic shied in accordance with the embodiment shown in FIG. 8.

FIG. 8 illustrates an EMI shield 50 in accordance with an embodiment of the present invention. The EMI shield 50 comprises a shield aperture 52 sized to enable the protruding connector 14 to project therethrough. The EMI shield 50 is advanced over the protruding connector 14. The EMI shield 50 has flexible fingers 54 which are adapted to make contact with the bezel 30, and therefore the housing 20, to effect an electrical ground, as shown in FIG. 9. The alignment plate 40 is assembled over the connectors 14,15,18 and placed in electrical contact with the EMI shield 50. Contact between the alignment plate 40 and the EMI shield 50 ensures that an electrical connection between the two is made such that the alignment plate 40 may further act as an EMI shield 50. The alignment plate 40 will therefore provide EMI shielding for the remainder of the connectors 15,18 over which it is placed. The small manufacture tolerance of the apertures 16,17,19 in the alignment plate 40 permitted by application of this invention further improves the effectiveness of the EMI shielding as spaces between connectors 14,15,18 and the shielding is greatly reduced. The alignment plate 40, when used in cooperation with an EMI shield 50, effectively reduces EMI around the area adjacent the connectors 14,15, 18.

Figure 10:
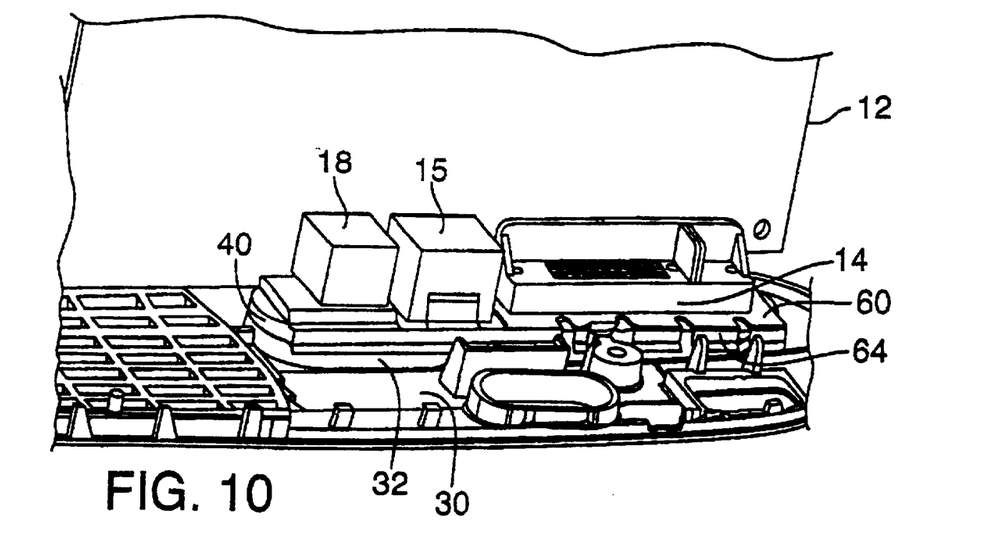
FIG. 10 is a view of an electromagnetic shield in accordance with another embodiment the invention.

FIG. 10 illustrates an EMI shield 60 in accordance with another embodiment of the invention. The EMI shield 60 in this embodiment comprises apertures corresponding to all the connectors 14,15,18 on the PC board 12. The EMI shield 60, therefor, provides direct EMI shielding for all the connectors 14,15,18. The edges 64 of the EMI shield 50 are in electrical contact with the bezel 30 to effect EMI shielding.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. An electronics housing enabled to compensate for the accumulation of dimensional tolerances to enable reliable connection between one or more internally-mounted connectors on one or more internal components and external connectors from one or more external devices, comprising:
   an alignment plate having an aperture therein corresponding to each internally-mounted connector, the alignment plate disposed adjacent to the internally-mounted connectors, the apertures adapted to enable engagement between the one or more internally-mounted connectors and external connectors; and
   a connector bezel comprising a bezel aperture, the alignment plate being disposed in the connector bezel adjacent the bezel aperture to enable the one or more internally-mounted connectors to engage the external connectors, the alignment plate coupled to the connector bezel enabling transverse displacement of the alignment plate with respect to the bezel to compensate for manufacturing and assembly tolerances of the housing, the internal components, the bezel, and the one or more internally-mounted connectors and thereby ensuring a reliable engagement of the one or more internally-mounted connectors with the external connectors.

2. An electronics housing as defined in claim 1, wherein the connector bezel further comprises:
   one or more engagement tabs adjacent to and depending from the bezel aperture, the tabs adapted to couple the alignment plate to the bezel while enabling transverse displacement of the alignment plate with respect to the bezel.

3. An electronics housing as defined in claim 2, wherein the alignment plate further comprises:
   one or more notches in at least one edge of the alignment plate, the one or more notches strategically placed to correspond to the one or more engagement tabs enabling the placement of the alignment plate adjacent the bezel aperture with the one or more notches and one or more tabs in alignment and enabling the coupling of the alignment plate to the bezel when the alignment plate is displaced transverse to the bezel with the one or more notches and one or more tabs out of alignment.

4. An electronics housing as defined in claim 3, wherein the engagement tabs are positioned relative to each other such that the alignment plate can engage the bezel in only one orientation.

5. An electronics housing as defined in claim 4, wherein the alignment plate further comprises a registration rib, the registration rib adapted to engage a body portion of an internally-mounted connector which enables alignment of the alignment plate apertures with respect to the corresponding internally-mounted connectors.

6. An electronics housing as defined in claim 4, wherein the alignment plate further comprises a raised boss adapted to compensate for an offset distance between an internally-mounted connector and the bezel aperture.

7. An electronics housing as defined in claim 4, wherein at least one of the internally-mounted connectors protrudes through one of the alignment plate apertures which enables alignment of the alignment plate apertures with respect to the corresponding internally-mounted connectors.

8. An electronics housing as defined in claim 1, further comprising an EMI shield, the EMI shield comprising:
   at least one aperture adapted to accept an internally-mounted connector therethrough, the EMI shield in electrical communication with a surface of the bezel, the alignment plate placed in electrical engagement with the EMI shield enabling the EMI shield and alignment plate to provide electromagnetic shielding about the connectors.

9. An electronics housing as defined in claim 8, the EMI shield further comprising one or more resilient fingers adapted to engage the bezel and in electrical communication therewith.

10. An assembly comprising:
    a pre-assembly of multiple electronic components including multiple connectors in precise relative relationship;
    a housing, the pre-assembly of multiple electronic components mounted in the housing, the housing provided with a primary opening exposing the multiple connectors exterior to the housing, the primary opening oversized to accommodate dimensional tolerance in the mounting of the pre-assembly into the housing and thereby insure exposure of the connectors through the primary opening;
    an alignment plate provided with multiple complimentary secondary openings precisely sized and precisely organized to fit the multiple connectors, the alignment plate adjustably secured to the housing over the primary opening for adjustable positioning of the alignment plate relative to the connectors to thereby expose the connectors through the secondary openings.

11. An assembly as defined in claim 10 wherein the multiple connectors include at least one connector protruded from the housing, the alignment plate adjustable to provide protrusion of the at least one connector through a complimentary secondary opening in the alignment plate and to thereby align all of the connectors with their respective complimentary secondary openings in the alignment plate.

12. An assembly as defined in claim 10 wherein the housing comprises one or more engagement tabs, the engagement tabs adapted to couple the alignment plate to the housing while enabling adjustable displacement of the alignment plate with respect to the housing.

13. An assembly as defined in claim 10 wherein the alignment plate further comprises:

one or more notches in at least one edge of the alignment plate, the one or more notches strategically placed to correspond to the one or more engagement tabs enabling the placement of the alignment plate adjacent the primary opening with the one or more notches and one or more engagement tabs in alignment and enabling the coupling of the alignment plate to the housing when the alignment plate is adjusted out of alignment with the engagement tabs.

14. An assembly as defined in claim 13 wherein the engagement tabs are positioned relative to each other such that the alignment plate can engage the engagement tabs in only one orientation.

15. An assembly as defined in claim 10, wherein the alignment plate further comprises a registration rib, the registration rib adapted to engage a body portion of one of the multiple connectors and to thereby align all of the connectors with their respective complimentary secondary openings in the alignment plate.

16. An assembly as defined in claim 10 wherein the alignment plate further comprises an inwardly-projecting boss adapted to compensate for an offset distance between one of the multiple connectors and the primary opening.

17. An assembly as defined in claim 10 further including an EMI shield, the EMI shield comprising:

at least one aperture adapted to accept at least one of the multiple connectors therethrough, the EMI shield in electrical communication with the housing, the alignment plate placed in electrical engagement with the EMI shield enabling the EMI shield and alignment plate to provide electromagnetic shielding about the multiple connectors.

18. An assembly as defined in claim 17 wherein the EMI shield includes one or more resilient tabs adapted to urge against the housing and in electrical communication therewith.

* * * * *

UNITED STATES PATENT AND TRADEMARK OFFICE
CERTIFICATE OF CORRECTION

PATENT NO. : 6,426,882 B1
APPLICATION NO. : 09/992040
DATED : July 30, 2002
INVENTOR(S) : Greg Sample It is certified that error appears in the above-identified patent and that said Letters Patent is hereby corrected as shown below:

Title Page of Patent Item [73]
Assignee name "InFocus Systems, Inc." should be "In Focus Systems, Inc."

Signed and Sealed this

Third Day of November, 2009

David J. Kappos
*Director of the United States Patent and Trademark Office*